United States Patent
Costa et al.

(10) Patent No.: US 8,029,887 B2
(45) Date of Patent: Oct. 4, 2011

(54) OPTICAL ARTICLES AND SOL-GEL PROCESS FOR THEIR MANUFACTURE

(75) Inventors: Fulvio Costa, Sommo (IT); Lorenzo Costa, Sommo (IT); Lucia Gini, Novara (IT)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/175,699

(22) Filed: Jul. 18, 2008

(65) Prior Publication Data

US 2009/0017274 A1   Jan. 15, 2009

Related U.S. Application Data

(63) Continuation of application No. 10/550,161, filed on Sep. 20, 2005, now abandoned.

(30) Foreign Application Priority Data

Mar. 20, 2003 (IT) .............................. NO2003A0004
Mar. 8, 2004 (WO) ................. PCT/EP2004/002327

(51) Int. Cl.
*B32B 17/00* (2006.01)
*B32B 3/00* (2006.01)
*G02B 3/00* (2006.01)
*B32B 17/06* (2006.01)

(52) U.S. Cl. ......... 428/220; 428/426; 428/446; 423/338
(58) Field of Classification Search .................... None
See application file for complete search history.

(56) References Cited

U.S. PATENT DOCUMENTS

| | | |
|---|---|---|
| 4,317,668 A | 3/1982 | Susa et al. |
| 4,426,216 A | 1/1984 | Satoh et al. |
| 4,432,956 A | 2/1984 | Zarzycki et al. |
| 4,806,328 A | 2/1989 | Van Lierop et al. |
| 5,948,535 A | 9/1999 | Chiurlo et al. |

FOREIGN PATENT DOCUMENTS

| | | |
|---|---|---|
| EP | 0 586 013 | 3/1994 |
| EP | 0 705 797 | 4/1996 |
| JP | 63-052104 | 3/1988 |
| JP | 01-056330 | 3/1989 |
| JP | 2002-068755 | 3/2002 |
| WO | 93/21120 | 10/1993 |

OTHER PUBLICATIONS

Costa, L. and D. Kerner, High Purity Glass Forms by a Colloidal Sol-Gel Process, J. of Sol-Gel Science and Technology, vol. 26 (2003), pp. 63-66.*

* cited by examiner

*Primary Examiner* — Aaron Austin
(74) *Attorney, Agent, or Firm* — Smith, Gambrell & Russell, LLP

(57) ABSTRACT

An optical article, having an almost complete isotropy and dimensions equal to or lower than 500 .mu.m, is prepared by a sol-gel procedure comprising a preliminary step wherein the mould is filled cold with a sol containing the desired oxide precursors, sol gelation, gel drying, removal of the gel from the mould and the subsequent miniaturization of the dried gel. The optical article can be used for optic telecommunications.

1 Claim, 3 Drawing Sheets

OPTICAL ARTICLES AND SOL-GEL PROCESS FOR THEIR MANUFACTURE

REFERENCE TO RELATED APPLICATIONS

This application is a continuation of U.S. patent application Ser. No. 10/550,161 filed Sep. 20, 2005, now abandoned which is relied on and incorporated herein by reference.

INTRODUCTION AND BACKGROUND

The present invention refers to optical components consisting of silicon oxide, as such or suitably combined, in final or nearly final dimensions, having an almost totally isotropy and sizes equal to or lower than 500 um; furthermore the invention relates to the means used to carry out the preparation of such optical articles, as well as to the process for the preparation of both of them.

It is known that the optical materials, particularly the transparent optical materials, are typical materials of known machining difficulty and, sometimes, troublesome preparation because their fragility and hardness which, for example, are conditioning the hot molding by causing optical components and devices not being generally acceptable for reasons of product quality.

Usually, the methods for the production of uncommon morphology optical elements comprise reducing suitable preforms through extremely accuracy lens milling operations: These are methods requiring a very precise handling even through the employment of suitable equipment, this sometimes being the reason of difficult repeatibility and poor process flexibility.

One solution has been achieved by producing aspheric lenses through high temperature and pressure preparations, directly from suitable preforms of the desired optical material: however, the method has applicability limits, needs sophisticated equipment and can be carried out only through considerable investment.

One method for reducing costs consists in the use of organic optical material, i.e. plastic material, which can be melted and molded using very economical processes. However, the employment of plastic material is sometimes the cause of dimensional defects of final optical product, because of the insufficiently controllable material shrinkage during the molding treatment.

The Applicant is able to overcome all drawbacks being in the processes for the preparation of optical materials according to the known art, by means of the object defined in the European patents no. 586.013 and no. 705.797 it may freely use: according to such patents, it is possible to prepare perfectly and completely isotropic optical components in their final or nearly final dimensions by applying thermochemical densification treatment to an amorphous monolithic aerogel of silica, and/or other oxides, by the use of high precision tools and the former preparation of such aerogel via a so called sol-gel process during which the intermediate products, till the gel formation, undergo an ultrawave treatment.

The final optical product, obtainable through tolerable investments and absolutely repeatable methods, is characterized by very high precision and dimensional steadfastness: however, it is such and the relevant preparation method is advantageous when the optical article dimensions are beyond a threshold, under which machining difficulties may arise in the mould formation formation, particularly in the preparation of moulds representing microstructures which cannot be processed by means of the common machining tools such as, for example, the microlens matrix or other periodic microstructures needing a dimensional resolution of each element under the entrusting threshold of the existing machinery. Such difficulties increase in the case of preparation of optical articles in the peculiar microoptical field, wherein positioning and lining up problems have to solve of the magnitude order of micron and lower, and that, furthermore, has applications other than the ones pertaining to the traditional optic such as telecommunications, pick-up laser, semiconductor laser, optical memory.

SUMMARY OF INVENTION

The Applicant has now found it is possible to overcome all above drawbacks and to consequently prepare optical articles, till to the lowest possible dimensions, according to an economically advantageous and repeatable method, which substantially consists in a preliminar arrangement of the desired dimension moulds and the subsequent use thereof in the preparation of the very optical article.

Therefore the present invention relates to a process for the preparation of moulds suitable to manufacture optical articles, as well as for the preparation of such optical articles, these consisting silicon oxide, as such or whit suitable additives, and characterized by an almost total isotropy and dimensions equal to or lower than 500 pm, which process comprises one or more of the following operations that, all together, can be continuously carried out in a fall and/or stopped at the desired or suitable step:

a. preparation of an original high precision mould;
b. possible reproduction, in a siliconic rubber or other suitable compound, of one or more imprints, having the same sizes and a reversed symmetry with respect to the moulds obtainable through the preceding steps;
c. preparation, by the employment of one or more of the products obtained in the preceding steps, of the optical article having reduced dimensions and reversed symmetry with respect to the starting mould/imprint; according to a sol-gel procedure;
d. possible preparation, inside the so obtained optical article, of a further article again having reduced sizes and reversed symmetry, or of imprints according to the preceding item b);
e. and so on, possibly, through the preparation of optical articles by sol-gel procedures and/or imprints according to b), till the desired dimensions or, anyhow, till the lowest dimensions on the ground of the physical limit of the process;
f. possible separation, in relation with any step, of the imprint and/or the article obtained in the very step.

Some of the above operative steps may be furtherly detailed:

a) a mould is prepared, hereinafter defined as original mould, made by aluminum alloy or in other material with a suitable chemical stability and able to undergo a precision machining processing;
b) one or more imprint are prepared in siliconic rubber or other suitable compound, having the same sizes and a reversed symmetry (mirror image) with respect to the original mould;
c) by the use of the so obtained imprint as a new mould (resulting symmetrically reversed with respect to the original mould) a molded manufactured article is prepared trough a sol-gel process in silica glass which has lower dimensions according to the linear shrinkage coefficient and the same symmetry as the original mould. The so obtained silica glass can be find application either as optical component or as a mould for a following molding operation;

d) the so obtained manufactured article can be used as a reversed imprint in view of a further operation to sol gel produce an optical article having further reduced dimensions and reversed symmetry (mirror image) with respect to the original mould. The use of the reversed imprint made by a siliconic rubber (or other material) is a possible one and may be repeated during the process route, if necessary or opportune according to the man skilled in the art.

The preparation of the original mould according to item a) can be the first operation of the fall process according to the present invention, or it may be carried out independently, and the obtained mould may be suitably stored, to be subsequently employed.

Such a preparation occurs according to techniques well known to the people skilled in the art, and the choice thereof substantially depends on the sizes of the mould itself. The technique grounds, starting from the conventional ones, are:
 use of numerically controlled machines;
 use of special machine tools provided with a "turning diamond";
 use of cutting machine to treat conventional optical networks;
 microscopic geometry based technologies providing photolitographic techniques combined with microerosion techniques;
 ablation through high power laser radiations.

DETAILED DESCRIPTION OF INVENTION

Figure 1:
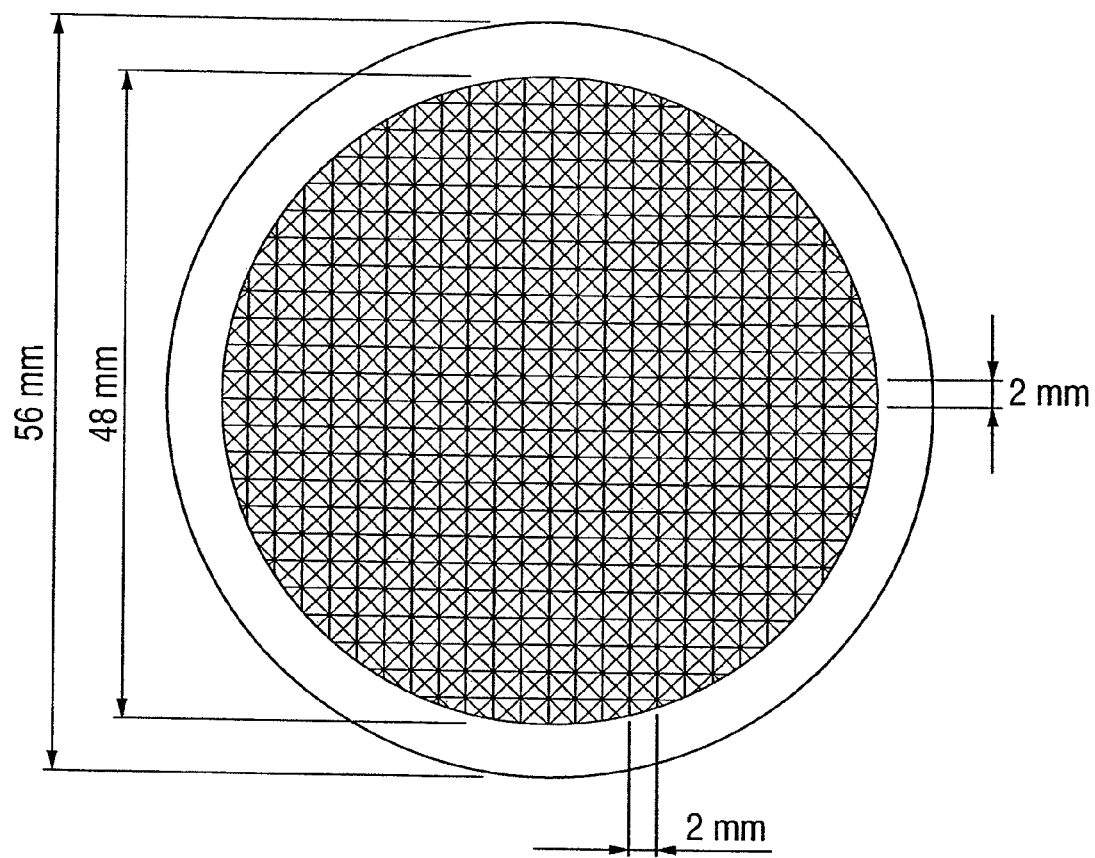
FIG. 1 is a top view of a mould of the invention.

The materials employed to prepare the original moulds commonly are metal alloys, preferably nickel/phosphorous based alloys on aluminum carriers, or aluminum alloys commercially known as "anticorodal" such as, for instance, the ones defined as follows by UNI rules: 9006/1, 9006/2, 9006/4, 9006/5, 9006/6. Of course it is possible the use of any other carrier with the necessary workability and steadiness properties. Also the replication of these moulds into siliconic rubber (or other material) imprints, without any risk occurring onto the original mould, is carried out according to procedures well known to the people skilled in the art. The main purpose of this preparation step is the production of an opportune, even if not necessary, mould number in view of any subsequent operation, as well as the maintenance of the original mould.

Inside the moulds obtained thereby, in the original one as well as in the subsequent imprints, other manufactured articles employable as moulds or optical articles are then produced, having reduced dimensions and, time by time, reversed symmetry, through sol-gel procedures: the sol-gel processes are carried out according to the well known technologies, on the ground of just common principles and methods, about which reference can be made to the field literature, patents too such as U.S. Pat. Nos. 4,317,668, 4,426,216, 4,432,956 e 4,806,328.

When the production, at any step of the above fall process, aims to obtain an optical article, the dried gel is removed from the mould to be submitted to a suitable isotropicminiaturization.

The composition of the moulds and/or optical articles prepared after the step b) of the inventive process, comprises a silicon oxide, as such or added by oxides of elements modifying the properties thereof, in particular way le optical properties.

An example of the modification of the optical properties of the silica glasses consists in the refraction index increase, that is obtained by a suitable chemical formulation of the sol, which precursors of the appropriate oxide are added to, particularly titanium and/or germanium oxides. By following the same trick, other optical properties are modified such as the optical dispersion, through the addition of precursors of oxides of elements belonging to the lanthanium group. The addition of appropriate active oxide precursors to sol can promote also the modification of properties other than the optical ones: for instance, the silica glass thermomechanical properties, mainly the specific thermic dilatation may be reduced beyond one magnitude order if the glass formulation comprises a titanium oxide fraction. Moreover it is possible to give the silica glass novel functional properties such as, for instance, the photoluminescence with peculiar emittance and excitation spectrum selectivities that can be obtained by the presence of traces of oxides particularly active in the field such as the appropriate excited rare earth oxides.

In the case of use of the manufactured article obtained via the inventive process as a mould, the same submitted to surface treatments by means of appropriate antiadhesive agents that permit the removal of the product subsequently obtained therein, either optical component or mould again to prosecute the miniaturization fall process.

An example for the preparation of a silica glass mould is given by the surface silanization to passivate all surface active sites (hydroxyl groups or hydroxyl groups precursors) in order to avoid the adhesion of the silicic gel that is aimed to be molded.

EXAMPLES

Example No. 1

Diamond Cutting Structure

A. Manufacture of the Original Mould

An original mould was prepared as specified hereinafter. Drawings according to the FIGS. 1 and 2 were supplied by a shop qualified for very high precision works through the commercially known "turning diamond" machine tool, by which it is possible to finish off a metal surface having an average roughness lower than 20 nm.

The material to build the original mould was an aluminum alloy, commercially known as "CERTAL".

The structure of the original mould was a 48 mm diameter ring fully covered by square pyramids having a 2 mm side and about 1.75 mm height. The structured ring was in the center of a metal disk made by aluminum alloy "CERTAL" and having a 56 mm diameter.

Figure 2:
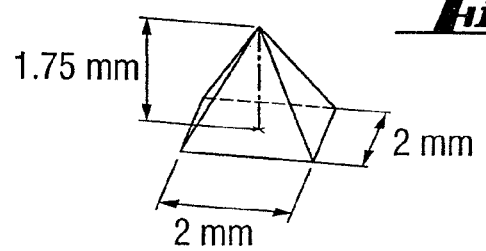
FIG. 2 is an enlarged view of a single square pyramid as appears in the mould of FIG. 1.

A view of the structure is in the FIG. 1 showing, at sizes doubled with respect to the true ones, the structure layout. The single square pyramid is illustrated, with strongly enlarged sizes, (10:1) by the lateral view of the FIG. 2.

The structure to be build, integrally formed by rectilinear segments of dimensions not lower than about 2 mm, was, as far as that kind of drawing was concerned, in a size range well compatible with the type of machine used. The prototype of the original mould satisfying required specifications, was easily obtained by the encharged shop.

B. Reversed Symmetry Replication through Siliconic Rubber Imprint

An imprint of the original mould was obtained by using the suitable compound ELASTOSIL M4601 produced by WACKER CHEMIE GmbH according the usual procedure suggested by the very producer.

C. Miniaturized Replication n.1, in Silica Glass

The siliconic rubber imprint obtained in B was used as a mould for a conventional high precision moulding silicic sol, according to U.S. Pat. No. 5,948,535.

Accordingly, the following operation was carried out: 100 gr of TEOS (tetraethylorthosilicate) were put into a 1000 ml borosilicate glass flask, under a suitable stirring of a magnetic anchor. 300 g of 0.01NHCl in bidistilled water were added to TEOS in the flask. The TEOS complete hydrolysis was achieved by an ultrasound probe treatment over 10 minutes. Hydrolysis ethanol was partially extracted under reduced pressure by a 150 ml volume liquid. 60 g of AEROSIL SiO2, OX-50 DEGUSSA A.G., were added to the residue recovered from the rotating evaporator and properly homogenized and centrifuged. The silicic sol, before being poured into the siliconic rubber mould, was brought to pH 4 through a gradual addition of a 0.5N watery ammonium hydroxide.

The sol gelation occurred in about 60 minutes. The obtained gel was conventionally treated, according to U.S. Pat. No. 5,948,535, converted to aerogel and densified to silica glass.

The obtained product, as very pure silica glass, was a miniaturized replication of the original mould. It is possible to note, through an eye inspection, that the structure of the original mould was faithfully reproduced in the glass replication with an isotropic linear reduction of all sizes by a factor of about 2.

D. Reversed Symmetry Imprint No. 2

By using the silica glass product obtained in the preceding operation, a novel imprint was prepared according to the procedure previously disclosed in B with reference to the original mould.

E. Silica Glass Miniaturized Replication No. 2

The siliconic rubber imprint obtained in D was employed as a mould according to a procedure similar to the one previously specified in the operation C. The obtained silica glass product was a very good quality replication of the original mould structure once miniaturized in C, and, the second time, in E. It is possible to note, through an eye inspection, that the structure of the original mould Was apparently faithfully reproduced with an isotropic linear shrinkage of a factor equal to 4.

The same procedure was applied to reach, through subsequent operations of siliconic imprint as well as of miniaturization in silica glass, a third and a fourth reduction level of reduction of the original mould structure.

The results of the dimensional analyses of all silica glass structures obtained thereby are summarized in the table 1.

TABLE 1

|  | original | reduction 1 | reduction 2 | reduction 3 | reduction 4 |
|---|---|---|---|---|---|
| disk external diameter (mm) | 56.0 | 28.0 | 14.0 | 7.0 | 3.5 |
| square pyramid side (mm) | 2.0 | 1.0 | 0.5 | 0.25 | 0.125 |

The table 1 data outline the inventive level and the industrial utility of the disclosed invention: a microstructure was obtained through a novel "cascade" process allowing to use the conventional mechanical processing high precision to build the original mould as well as to transfer the same precision to a micrometric scale through the new cascade miniaturized process.

Example No. 2

Microlens Matrix

A. Original Mould Manufacture

An original mould was prepared according to the disclosure of example n.1, paragraph A, but one difference: the square pyramids having a 2 mm side and a 1.75 mm height of the example 1 were now substituted by truncated square pyramids, fully equal to the above described pyramids, but being truncated at a 1.6 mm height.

B. Reversed Symmetry Replication through Siliconic Rubber.

One original mould imprint was obtained by means of the procedure already disclosed in the paragraph B of the example 1.

C. Silica Glass Miniaturized Replication n.1

An original mould replication was prepared through the procedure already described in the paragraph C of the example 1. The silica glass original replication, having good optical properties, was similar to the original one, also having a morphology ideally corresponding to the morphology of the original mould, according to one to one correspondence. Only the dimensions were smaller being linearly reduced by a factor of 2. Particularly the base side of the truncated pyramid was reduced to 1 mm and the height to 0.82 mm.

The obtained manufactured article was used in the optical field as microlens matrix. Accordingly, an object was put under the ground containing the truncated pyramid square bases, 15 mm for therefrom. The imagine was collected and focused by a lens having the optical axis perpendicular to the base ground on the structure side, sited to see the structure even if in the opposite side with respect to the object: therefore, vertically above the truncated pyramids.

Figure 3:
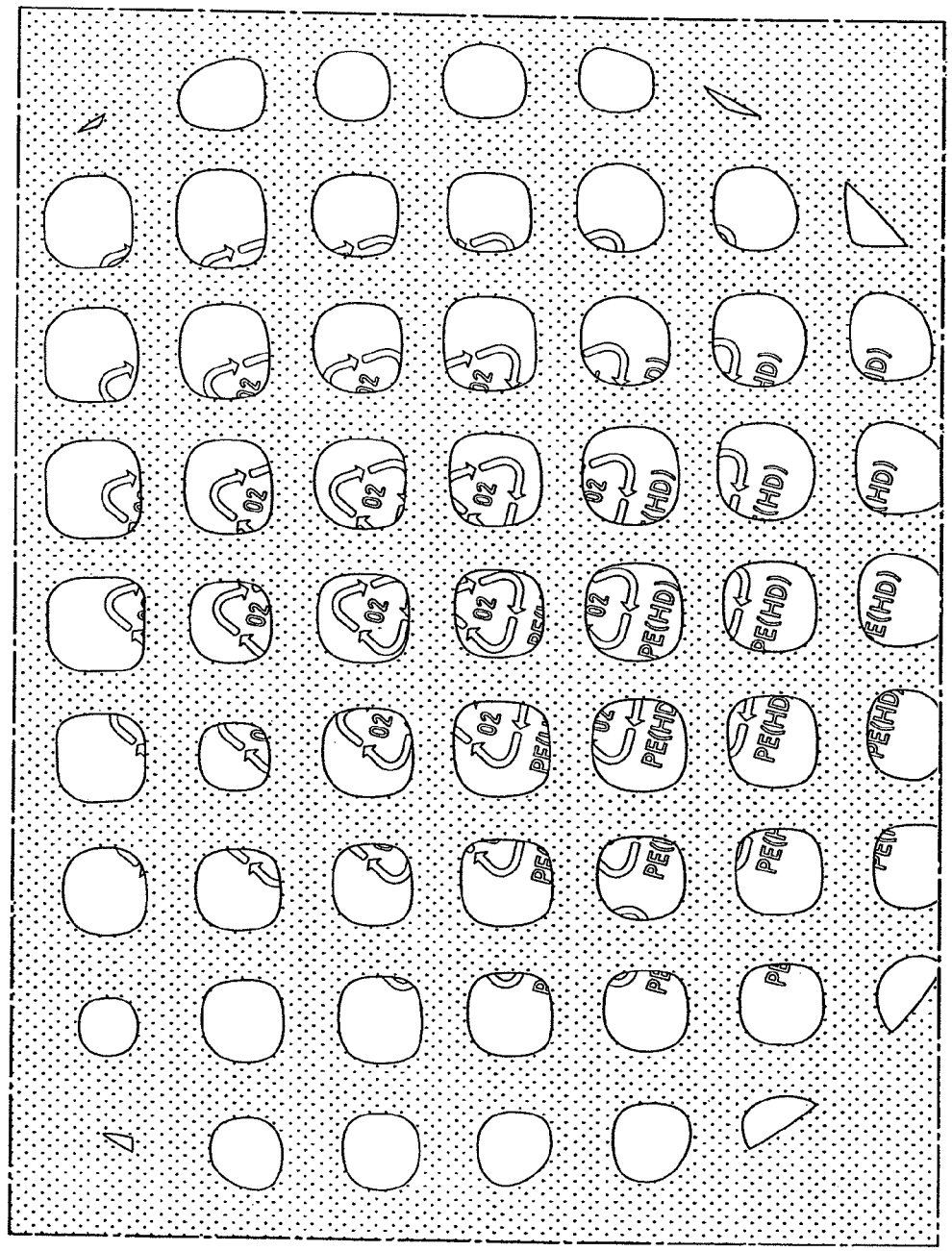
FIG. 3 is a schematic representation of a lens showing an object.

The results are photographically illustrated in the FIG. 3, showing the object, constituted by a triangular mark with the number 02, faithfully reproduced through multiple imagines, each one produced from a different lens of the circular matrix, i.e. from a truncated pyramid of the molded structure.

Figure 4:
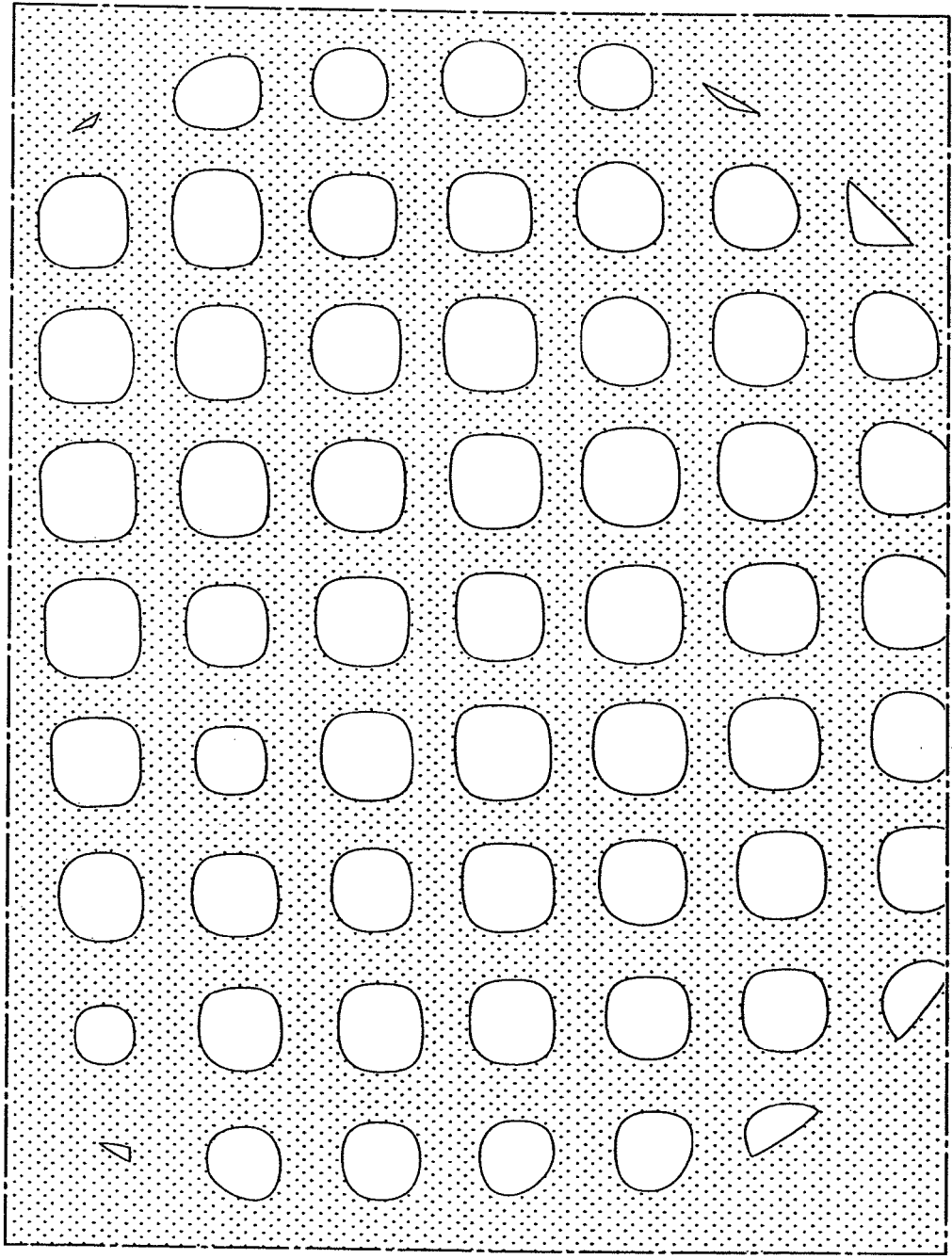
FIG. 4 is a schematic representation of the lens with the object removed.

As a control, the FIG. 4 shows, under the same optical conditions, the same pyramidal structure, the object having been removed: clearly, there is no multiple imagine of the object.

The manufactured article, prepared according to this example was used, in the same example, as optical device so called "fly eye", i.e. as the multichannel lens of an optical system able to show an object at 360 degree latitude above a determined horizon. The comparison between the FIGS. 3 and 4 outlines that the result was obtained.

The invention claimed is:

1. An optical article having periodic microstructure comprising pure silicon oxide, optionally modified by the addition of one or more oxides of elements other than silicon, having essentially complete isotropy and dimensions of the periodic microstructure are equal to or lower than 500 µm, where the article is made by a process comprising,
   a) preparing at least one original high precision mould having an average roughness lower than 20 nm;
   b) reproducing, in a silicone rubber, one or more imprints, having the same size and a reversed symmetry with respect to said mould;
   c) preparing by the employment of one or more of the moulds obtained in step a) or imprint obtained in step b) an optical article having reduced dimensions and reversed symmetry with respect to the starting mould/imprint; according to a sol-gel procedure, in which the sol-gel procedure comprises a preliminary step of filling said mould in a cool state with a sol containing pure silicon oxide precursors, gelling the sol, drying the sol to form a dried gel, removing the dried gel from the mould and miniaturizing the dried gel to form an optical article,
   d) preparing from the so obtained optical article a further optical article again having reduced sizes and reversed symmetry, or of imprints according to step b);
   e) repeating steps c)-d), each repetition results in successively smaller microstructure dimensions by a factor of two until a desired miniaturized dimension is achieved.

* * * * *